(12) United States Patent
Yamasaki

(10) Patent No.: US 8,442,379 B2
(45) Date of Patent: May 14, 2013

(54) BROADCAST RECEPTION APPARATUS

(75) Inventor: Masaya Yamasaki, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 392 days.

(21) Appl. No.: 12/836,426

(22) Filed: Jul. 14, 2010

(65) Prior Publication Data

US 2011/0052143 A1 Mar. 3, 2011

(30) Foreign Application Priority Data

Aug. 31, 2009 (JP) ................................. 2009-200855

(51) Int. Cl.
*H04N 5/76* (2006.01)

(52) U.S. Cl.
USPC ........................................................ 386/238

(58) Field of Classification Search ........................ None
See application file for complete search history.

(56) References Cited

U.S. PATENT DOCUMENTS

| 2005/0113143 | A1 | 5/2005 | Oiwa |
| 2007/0019115 | A1* | 1/2007 | Umeda .......................... 348/730 |
| 2008/0031589 | A1 | 2/2008 | Ariyoshi et al. |
| 2009/0204992 | A1* | 8/2009 | Boyce et al. ..................... 725/40 |

FOREIGN PATENT DOCUMENTS

| JP | 10108115 | 4/1998 |
| JP | 2007036629 | 2/2000 |
| JP | 2002300058 | 10/2002 |
| JP | 2002300059 | 10/2002 |
| JP | 2005159615 | 6/2005 |
| JP | 2007036333 | 2/2007 |
| JP | 2007066478 | 3/2007 |
| JP | 2007104192 | 4/2007 |
| JP | 2007110559 | 4/2007 |
| JP | 2007110562 | 4/2007 |
| JP | 2008042520 | 2/2008 |
| JP | 2008085941 | 4/2008 |
| JP | 2009081573 | 4/2009 |
| JP | 2009135687 | 6/2009 |
| WO | 2006035850 | 4/2006 |

OTHER PUBLICATIONS

Japanese Patent Application No. 2009-200855, Notice of Reasons for Rejection, mailed Oct. 5, 2010, (English Translation).
Japanese Patent Application No. 2011-015329, Notice of Reasons for Rejection, mailed Mar. 8, 2011, (English Translation).

* cited by examiner

*Primary Examiner* — Sath V Perungavoor
*Assistant Examiner* — Kate Luo
(74) *Attorney, Agent, or Firm* — Blakely, Sokoloff, Taylor & Zafman LLP

(57) ABSTRACT

According to one embodiment, a broadcast reception apparatus includes a first receiver, second receivers, a first controller, and a second controller. A first receiver is configured to switch to a channel as a target and receive a broadcast signal. Second receivers are configured to receive broadcast signals from channels which are set for the second receivers, respectively. A first controller is configured to perform display control to display a video on the basis of the broadcast signal received by the first receiver. A second controller is configured to switch between a first mode performing drive control of operation of the second receivers and performing record control based on the broadcast signals received by the second receivers, and a second mode performing control to stop operation of at least one of the second receivers and performing record control based on any remaining one or ones of the second receivers.

8 Claims, 3 Drawing Sheets ies of television broadcasts has come to be promoted recently. For example in Japan, terrestrial digital broadcasts have started in addition to satellite digital broadcasts, such as broadcasting satellite (BS) digital broadcasts and 110-degree communication satellite (CS) digital broadcasts.

BROADCAST RECEPTION APPARATUS

CROSS-REFERENCE TO RELATED APPLICATIONS

This application is based upon and claims the benefit of priority from Japanese Patent Application No. 2009-200855, filed Aug. 31, 2009; the entire contents of which are incorporated herein by reference.

FIELD

Embodiments described herein relate generally to a power saving technique for a broadcast reception apparatus comprising plural tuners.

BACKGROUND

As is well known, digitization of television broadcasts has come to be promoted recently. For example in Japan, terrestrial digital broadcasts have started in addition to satellite digital broadcasts, such as broadcasting satellite (BS) digital broadcasts and 110-degree communication satellite (CS) digital broadcasts.

A model of digital television broadcast receiver equipped with plural digital broadcast tuners has appeared. Such a digital television broadcast receiver has been highly functionalized so as to be capable of, for example, recording one other program while displaying one program to view. With increase in number of digital broadcast tuners built in a digital television broadcast receiver, the number of programs which can be recorded simultaneously when viewing a program increases.

Jpn. Pat. Appln. KOKAI Publication No. 2004-349790 discloses a configuration of a recording/reproducing device in which, when to reserve a program or record a reserved program, a signal processing circuit detects a power-on signal from a television receiver, and a power supply circuit supplies electric power to a control unit which controls units on the basis of the power-on signal.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a broadcast reception apparatus includes a first receiver, second receivers, a first controller, and a second controller. A first receiver is configured to switch to a channel as a target to be tuned and receive a broadcast signal. Second receivers are configured to receive broadcast signals from channels which are set for the second receivers, respectively. A first controller is configured to perform display control to display a video on the basis of the broadcast signal received by the first receiver. A second controller is configured to switch between a first mode and a second mode, the first mode performing drive control of operation of the second receivers and performing record control based on the broadcast signals received by the second receivers, and the second mode performing control to stop operation of at least one of the second receivers and performing record control based on any remaining one or ones of the second receivers.

Figure 1:
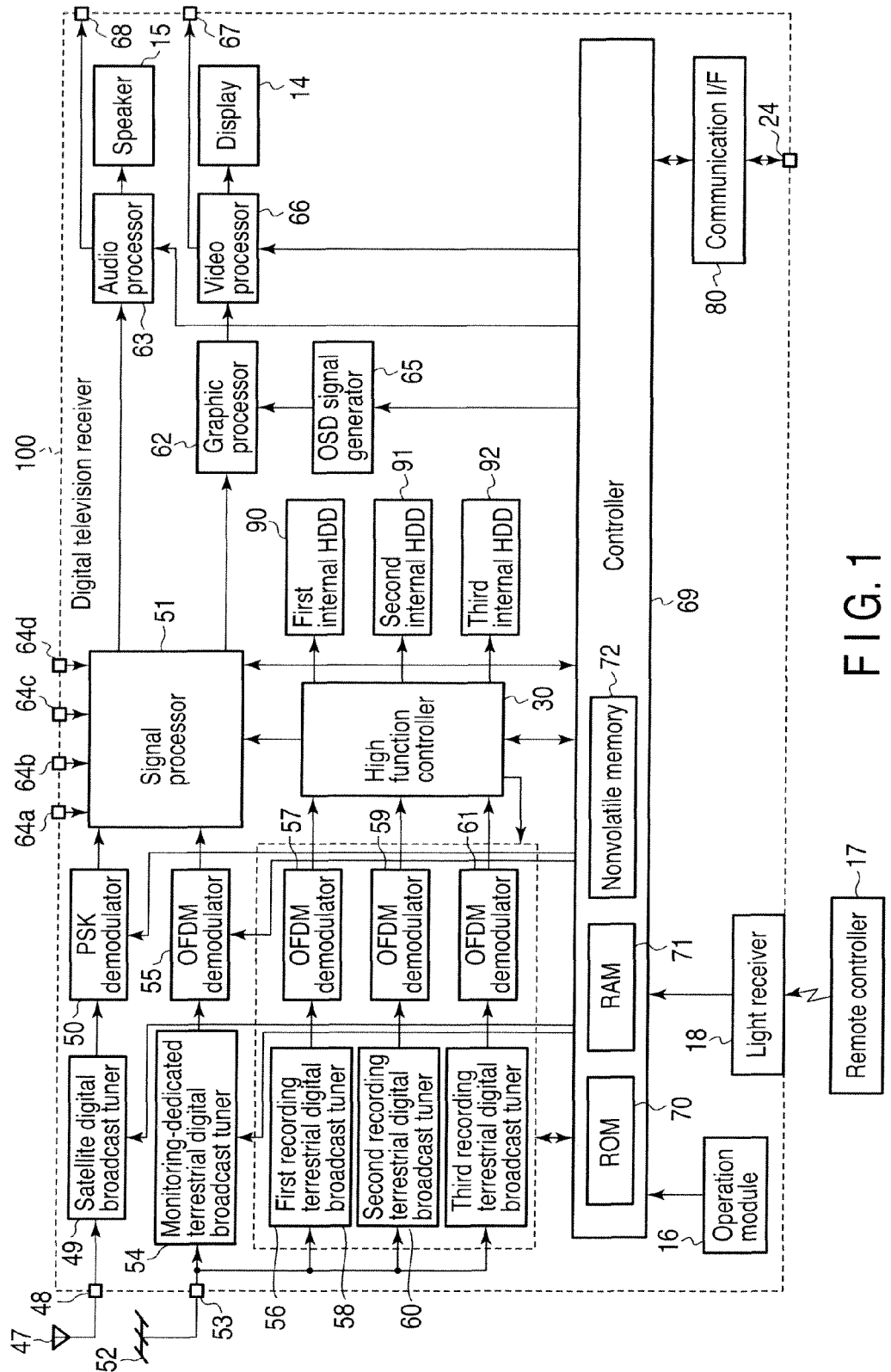
FIG. 1 is an exemplary block diagram representing a schematic configuration of a digital television broadcast reception apparatus according to an embodiment.

Hereinafter, an embodiment will be described with reference to the drawings. FIG. 1 is a block diagram expressing a schematic configuration of a digital broadcast receiver 100 according to the first embodiment. Specifically, a satellite digital television broadcast signal received by an antenna 47 for receiving BS/CS digital broadcasts is supplied to a satellite digital broadcast tuner 49 through an input terminal 48. The satellite digital broadcast tuner 49 tunes a broadcast signal from a desired channel.

The broadcast signal tuned by the satellite digital broadcast tuner 49 is further supplied to a phase-shift-keying (PSK) demodulator 50 and is thereby demodulated into digital video and audio signals, which are thereafter output to a signal processor 51.

Further, a terrestrial digital television broadcast signal received by an antenna 52 for receiving terrestrial broadcasts is supplied through an input terminal 53 to a monitoring-dedicated terrestrial digital broadcast tuner 54. The monitoring-dedicated terrestrial digital broadcast tuner 54 tunes a broadcast signal from a desired channel. The broadcast signal tuned by the monitoring-dedicated terrestrial digital broadcast tuner 54 is supplied to an orthogonal frequency division multiplexing (OFDM) demodulator 55 and is thereby demodulated into digital video and audio signals, which are then output to the signal processor 51.

Another broadcast signal tuned by a first recording terrestrial digital broadcast tuner 56 is supplied to another OFDM modulator 57 and is thereby demodulated into digital video and audio signals, which are then output to a high function controller 30. In the same manner as above, a still another broadcast signal tuned by a second recording terrestrial digital broadcast tuner 58 is supplied to a still another OFDM modulator 59 and is thereby demodulated into digital video and audio signals, which are then output to the high function controller 30. A still another broadcast signal tuned by a third recording terrestrial digital broadcast tuner 60 is supplied to a fourth OFDM modulator 61 and is thereby demodulated into digital video and audio signals, which are then output to the high function controller 30.

The digital television broadcast receiver 100 thus comprises the monitoring-dedicated terrestrial digital broadcast tuner 54, first recording terrestrial digital broadcast tuner 56, second recording terrestrial digital broadcast tuner 58, and third recording terrestrial digital broadcast tuner 60, and can therefore simultaneously tune four terrestrial digital broadcast signals at most. The present embodiment will be described referring to a case that the digital television broadcast receiver 100 comprises four terrestrial digital broadcast tuners. However, the digital television broadcast receiver 100 may alternatively be configured to comprise three or less or five or more terrestrial digital broadcast tuners.

The signal processor 51 selectively performs a predetermined digital signal processing on the digital video and audio signals which are supplied from each of the PSK demodulator 50 and OFDM modulator 55, and then outputs the digital video and audio signals to a graphic processor 62 and an audio processor 63.

Also, the signal processor 51 is connected to plural (four in case of the figure) input terminals 64a, 64b, 64c, and 64d. These input terminals 64a to 64d each allow analog video and audio signals to be input from outside of the digital television broadcast receiver 100.

The signal processor 51 selectively digitizes the analog video and audio signals supplied from each of the input terminals 64a to 64d, and performs a predetermined digital signal processing on the digitized video and audio signals. The signal processor 51 thereafter outputs the digitized video and audio signals to a graphic processor 62 and an audio processor 63.

The graphic processor 62 has a function to superpose an OSD signal generated by an on-screen display (OSD) signal generator 65, onto the digital video signal supplied from the signal processor 51, and to output the superposed signals. The graphic processor 62 is capable of selectively outputting an output video signal from the signal processor 51 and an output OSD signal from the OSD signal generator 65, and of outputting both signals combined so as to respectively correspond to two halves of a screen.

The digital video signal output from the graphic processor 62 is supplied to a video processor 66. A video signal processed by the video processor 66 is supplied to a display 14 and also to an output terminal 67. The display 14 displays a video based on a video signal. When an external device is connected to the output terminal 67, the video signal supplied to the output terminal 67 is then input to the external device.

The audio processor 63 converts an input digital audio signal into an analog audio signal in a reproducible format for the speaker 15. Thereafter, the audio processor 63 outputs the analog audio signal to the speaker 15 to reproduce a sound, and derives the analog audio signal to outside through an output terminal 68.

Figure 2:
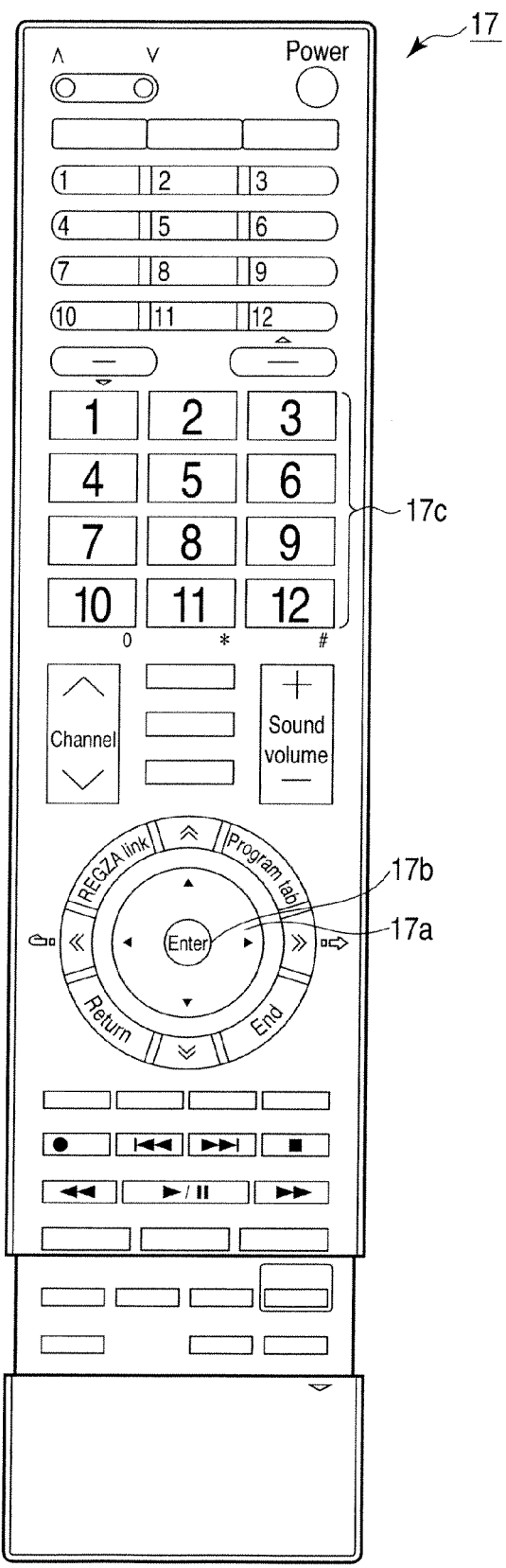
FIG. 2 is an exemplary exterior view illustrating a remote controller used for the digital television broadcast reception apparatus according to the embodiment.

In the digital television broadcast receiver 100, all operations including various receiving operations as described above are totally controlled by a controller 69. The controller 69 includes a central processing unit (CPU), etc., and receives operation information which is sent from a remote controller 17 and received through a light receiver 18. The controller 69 controls individual modules so as to reflect content of the operation information. As illustrated in FIG. 2, the remote controller 17 includes a cursor key (cross key) 17a, an enter key 17b, and a tuning key 17c.

The controller 69 mainly uses a read only memory (ROM) 70 which stores a control program executed by the CPU, a random access memory (RAM) 71 which provides the CPU with a work area, and a non-volatile memory 72 which stores various setting information and control information.

The controller 69 is connected to a LAN terminal 24 through a communication I/F 80. Therefore, the controller 69 can obtain information through the communication I/F 80 from a network such as the Internet.

Like the signal processor 51, the high function controller 30 selectively performs a predetermined digital signal processing on the digital video and audio signals which are supplied from each of the ORION modulator 57, 59, and 61.

The high function controller 30 is connected to a first internal hard disk drive 90 (HDD), a second internal hard disk drive (HDD) 91, and a third internal hard disk drive (HDD) 92. The first internal HDD 90, second internal HDD 91, and third internal HDD 92 record video and audio signals. Although this embodiment is described referring to a case that the digital television broadcast receiver 100 comprises three internal HDDs, the embodiment may be configured to comprise two or less HDDs or four or more HDDs.

The high function controller 30 controls on/off of a power supply of the first recording terrestrial digital broadcast tuner 56, OFDM demodulator 57, second recording terrestrial digital broadcast tuner 58, OFDM demodulator 59, third recording terrestrial digital broadcast tuner 60, OFDM demodulator 61, first internal HDD 90, second internal HDD 91, and third internal HDD 92. The controller 69 controls on/off of a power supply of the high function controller 30.

In this embodiment, if a user selects a channel to view by using the tuning key 17c on the remote controller 17, the monitoring-dedicated terrestrial digital broadcast tuner 54 then switches to a corresponding channel and tunes a broadcast signal. The display 14 displays a video of a program on the channel on the basis of the broadcast signal.

The first recording terrestrial digital broadcast tuner 56, second recording terrestrial digital broadcast tuner 58, and third recording terrestrial digital broadcast tuner 60 continually tune, for example, broadcast signals from channels of broadcast stations as follows.

The first recording terrestrial digital broadcast tuner 56 continually tunes a broadcast signal from a channel of a broadcast station A. The second recording terrestrial digital broadcast tuner 58 continually tunes a broadcast signal from a channel of a broadcast station B. The third recording terrestrial digital broadcast tuner 60 continually tunes a broadcast signal from a channel of a broadcast station C.

When an initial setting for the digital television broadcast receiver 100 is input by the remote controller 17, the high function controller 30 then sets channels of broadcast signals to be tuned by the first recording terrestrial digital broadcast tuner 56, second recording terrestrial digital broadcast tuner 58, and third recording terrestrial digital broadcast tuner 60. For example, if the number of channels as tuning targets in an area where the digital television broadcast receiver 100 is used is greater than the number of recording terrestrial digital broadcast tuners provided in the digital television broadcast receiver 100, the high function controller 30 may then set the channels, in order from the smallest channel number, as channels of broadcast signals to be tuned by the first recording terrestrial digital broadcast tuner 56, second recording terrestrial digital broadcast tuner 58, and third recording terrestrial digital broadcast tuner 60.

Alternatively, the user may set, in a different manner, a relationship between the first recording terrestrial digital broadcast tuner 56, second recording terrestrial digital broadcast tuner 58, and third recording terrestrial digital broadcast tuner 60. The high function controller 30 may appropriately change the broadcast signals to be tuned by the first recording terrestrial digital broadcast tuner 56, second recording terrestrial digital broadcast tuner 58, and third recording terrestrial digital broadcast tuner 60 for every predetermined period in order from the channel which has been viewed at the highest frequency.

The first internal HDD 90 records video and audio signals based on a broadcast signal tuned by the first recording terrestrial digital broadcast tuner 56. In the same manner as above, the second internal HDD 91 records video and audio signals based on a broadcast signal tuned by the second recording terrestrial digital broadcast tuner 58. Also in the same manner, the third internal HDD 92 records video and audio signals based on a broadcast signal tuned by the second recording terrestrial digital broadcast tuner 60.

In this embodiment, the HDDs and the tuners are associated in one-to-one correspondence with each other, for example, as the first internal HDD 90 corresponds to the first recording terrestrial digital broadcast tuner 56. Alternatively, the first internal HDD 90 may be configured to record all video and audio signals based on broadcast signals tuned by the first recording terrestrial digital broadcast tuner 56, second recording terrestrial digital broadcast tuner 58, and third recording terrestrial digital broadcast tuner 60.

The first internal HDD 90 is predetermined so as to record video and audio signals based on the broadcast signal tuned by the first recording terrestrial digital broadcast tuner 56. The second internal HDD 91 and third internal HDD 92 are predetermined as well. Alternatively, the user may set a relationship between the first internal HDD 90, second internal HDD 91, and third internal HDD 92 and the first recording terrestrial digital broadcast tuner 56, second recording terrestrial digital broadcast tuner 58, and third recording terrestrial digital broadcast tuner 60 by using the remote controller 17. The controller 69 may assign the first internal HDD 90, second internal HDD 91, and third internal HDD 92 to the channels, respectively.

Insofar as the first internal HDD 90 is not subjected to power supply control described later, the HDD 90 basically continues recording the program on the channel of the broadcast station A. In the same manner as above, the second internal HDD 91 continues recording the program on the channels of the broadcast station B. The third internal HDD 92 continues recording the program on the channels of the broadcast station C as well.

Figure 3:
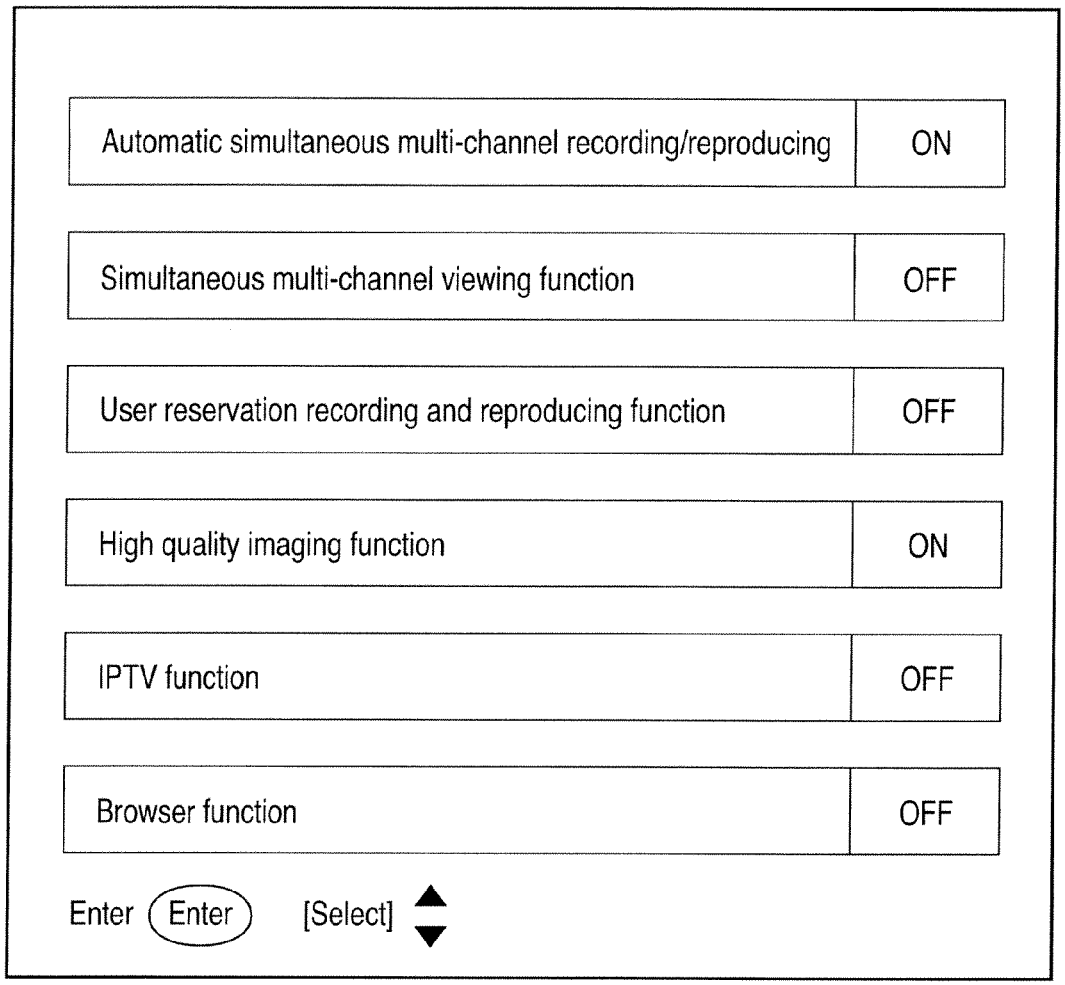
FIG. 3 is an exemplary screen view for setting functions of the digital television broadcast reception apparatus according to the embodiment.

FIG. 3 illustrates a setting screen for setting functions of the high function controller 30 to be controlled on/off, as on/off control targets. Based on an input from the remote controller 17, the controller 69 performs display control to display the screen as illustrated in FIG. 3 on the display 14. FIG. 3 illustrates a mere example, and the functions to be controlled on/off are not limited to this example.

The user can set on/off each of the functions by using a cursor key 17*a* and an enter key 17*b* on the setting screen. The functions available as on/off control targets are a simultaneous automatic multi-channel recording and reproducing function, a simultaneous multi-channel viewing function, a user-reservation recording and reproducing function, a high-quality imaging function, an IPTV function, and a browser function.

The simultaneous automatic multi-channel recording function is to record video and audio signals for all channels from which broadcast signals are tuned by the first recording terrestrial digital broadcast tuner 56, second recording terrestrial digital broadcast tuner 58, and third terrestrial digital broadcast tuner 60, onto the first internal HDD 90, second internal HDD 91, and third internal HDD 92. Similarly, the simultaneous automatic multi-channel reproducing function is to allow plural video and audio signals to be simultaneously read and reproduced from the first internal HDD 90, second internal HDD 91, and third internal HDD 92.

If this recording/reproducing function is on, the high function controller 30 turns on power supplies of the first recording terrestrial digital broadcast tuner 56 and the corresponding OFDM demodulator 57 and first internal HDD 90, the second recording terrestrial digital broadcast tuner 58 and the corresponding OFDM demodulator 59 and second internal HDD 91, and the third terrestrial digital broadcast tuner 60 and the corresponding OFDM demodulator 61 and third internal HDD 92.

Otherwise, if the recording/reproducing function is off, the high function controller 30 turns off the power supplies of the first recording terrestrial digital broadcast tuner 56 and the corresponding OFDM demodulator 57 and first internal HDD 90, the second recording terrestrial digital broadcast tuner 58 and the corresponding OFDM demodulator 59 and second internal HDD 91, and the third terrestrial digital broadcast tuner 60 and the corresponding OFDM demodulator 61 and third internal HDD 92.

Also, if the recording/reproducing function is on, the user can easily set recording from channels to be tuned, without making complex operations.

The simultaneous multi-channel viewing function is to display videos based on the broadcast signals tuned by the first recording terrestrial digital broadcast tuner 56, second recording terrestrial digital broadcast tuner 58, and third terrestrial digital broadcast tuner 60 together with program information on an electronic program guide EPG screen. In place of the EPG screen, divisional multiple screens may be displayed on the display 14 so as to display videos on plural channels.

In cases where this viewing function is on and off, respectively, the power supply on/off control operates in the same manner as in the cases described above where the simultaneous automatic multi-channel recording/reproducing function is on and off. However, the internal HDDs 90, 91, and 92 may alternatively be turned off.

The user-reservation recording function is to allow a user to set channels from which broadcast signals are tuned by the first recording terrestrial digital broadcast tuner 56, second recording terrestrial digital broadcast tuner 58, and third terrestrial digital broadcast tuner 60 by using the remote controller 17. Similarly, the user-reservation reproducing function is to allow video and audio signals to be read and reproducible from an internal HDD which has recorded video and audio signals among the first internal HDD 90, second internal HDD 91, and third internal HDD 92.

Therefore, the user can forbid that channels from which broadcast signals are tuned are set for the first recording terrestrial digital broadcast tuner 56, second recording terrestrial digital broadcast tuner 58, or third terrestrial digital broadcast tuner 60.

If the user-reservation recording/reproducing function is on and if the user puts the first recording terrestrial digital broadcast tuner 56 in a setting that tunes a broadcast signal, the high function controller 30 turns on power supplies of the first recording terrestrial digital broadcast tuner 56 and the corresponding OFDM demodulator 57 and first internal HDD 90. In addition, if the user does not put the second recording terrestrial digital broadcast tuner 58 in a setting that tunes a broadcast signal, the high function controller 30 turns off power supplies of the first recording terrestrial digital broadcast tuner 56 and the corresponding OFDM demodulator 57 and first internal HDD 90.

Otherwise, if the user-reservation recording/reproducing function is off and if the simultaneous automatic multi-channel recording/reproducing function is on, the high function controller 30 sets channels in accordance with this recording/reproducing function. Otherwise, if the simultaneous automatic multi-channel recording/reproducing function is also off, the high function controller 30 turns off all power supplies of the first recording terrestrial digital broadcast tuner 56 and the corresponding OFDM demodulator 57 and first internal HDD 90, the second recording terrestrial digital broadcast tuner 58 and the corresponding OFDM demodulator 59 and second internal HOD 91, and the third recording terrestrial digital broadcast tuner 60 and the corresponding OFDM demodulator 61 and third internal HDD 92, because an initial setting of the digital television broadcast receiver 100 is not set.

The user need not set channels for which recording is not required, for example, in the first recording terrestrial digital broadcast tuner 56. Therefore, power supplies of the first recording terrestrial digital broadcast tuner 56 and the corresponding OFDM demodulator 57 and first internal HDD 90 which are not required are off.

There is freedom in selecting how many sets of tuners and demodulators are assigned to each of the simultaneous automatic multi-channel recording/reproducing function or the simultaneous multi-channel viewing function and the user-reservation recording/reproducing function.

The high-quality imaging function is to raise image quality of a video signal to record. If this function is on, the high function controller 30 performs a high-quality imaging processing on video signals to be recorded onto or reproduced from the first internal HDD 90, second internal HDD 91, and third internal HDD 92. Further, the high function controller 30 controls the signal processor 51 so as to perform the high-quality imaging processing on image quality of a video signal to be displayed on the display 14.

If the high-quality imaging function is off, the high function controller 30 regularly processes the image quality of video signals to be recorded onto or reproduced from the first internal HDD 90, second internal HDD 91, and third internal HDD 92. The high function controller 30 processes the image quality of the video signal to be displayed on the display 14, in the same manner as above.

The IPTV (internet protocol television) function is to display IPTV on the display 14 through the communication I/F 80. If this function is on, the high function controller 30 controls display of the IPTV in accordance with an input given from the user by using the remote controller 17. Otherwise, if this function is off, the high function controller 30 sets the IPTV in a state in which viewing is forbidden.

The browser function is to display an internet screen on the display 14, for example, through the communication I/F 80. If this function is on, the high function controller 30 performs display control on the internet screen in accordance with an input given from the user by using the remote controller 17. If this function is off, the high function controller 30 sets the internet screen in a state in which the internet screen cannot be viewed.

As has been described above, the user can select a mode of activating all functions and a mode of inactivating at least one function. In the digital television broadcast receiver 100, power supplies of components constituting operations of unrequired functions are turned off. Accordingly, electric power saving of the digital television broadcast receiver 100 improves.

If the user sets all of the functions described above as being not required, the controller 69 turns off the power supply of the high function controller 30. For example, this is a case that the user wants simple viewing.

In this case, the controller 69 and high function controller 30 operate as follows. When the high function controller 30 is powered off, the controller 69 then performs control to fix signal lines from the OFDM demodulators 57, 59, and 61 to a low level, thereby to prevent current leakage.

When the high function controller 30 is powered off, the controller 69 then fixes a clock signal, which is supplied to the high function controller 30, to a low level.

When the controller 69 powers off the high function controller 30, neither the signal processor 51 nor the controller 69 then uses an input signal from the high function controller 30 any more.

When the controller 69 powers off the high function controller 30, the first recording terrestrial digital broadcast tuner 56 and the corresponding OFDM demodulator 57 and first internal HDD 90, the second recording terrestrial digital broadcast tuner 58 and the corresponding OFDM demodulator 59 and second internal HDD 91, and the third recording terrestrial digital broadcast tuner 60 and the corresponding OFDM demodulator 61 and third internal HDD 92 are powered off or put in a sleep state, linked with the high function controller 30 powered off.

Described next will be another example of an initial setting of the digital television broadcast receiver 100. This example supposes that the number of channels as targets to be tuned in an area where the digital television broadcast receiver 100 is used is smaller than the number of recording terrestrial digital broadcast tuners provided in the digital television broadcast receiver 100. The digital television broadcast receiver 100 is also supposed to be capable of receiving broadcast signals from the channels of the broadcast stations A and B and incapable of receiving a broadcast signal from the channel of the broadcast station C.

When to initially set up the digital television broadcast receiver 100, the high function controller 30 sets channels to be tuned by the first recording terrestrial digital broadcast tuner 56 and second recording terrestrial digital broadcast tuner 58. Since no channel is set to be tuned by the third recording terrestrial digital broadcast tuner 60, the high function controller 30 powers off the third recording terrestrial digital broadcast tuner 60 and the corresponding OFDM demodulator 61 and third internal HDD 92. Accordingly, the user need not put a setting for powering off an unrequired recording terrestrial digital broadcast tuner in the initial setup.

In this embodiment, the high function controller 30 records video and audio signals into the first internal HDD 90, second internal HDD 91, and third internal HDD 92. However, external HDDs connected to various terminals such as an HDMI terminal, a USB terminal, and an i.Link terminal are also available. The high function controller 30 need only send a signal for setting on/off a sleep state for each of such external HDDs.

Although the present embodiment has been described to be applicable to the digital television broadcast receiver 100 as illustrated in FIG. 1, applicability is not limited to this receiver. The present embodiment is applicable to a configuration of a set top box type in which at least the display 14 and speaker 15 are removed from the configuration illustrated in FIG. 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:
1. A broadcast reception apparatus comprising:
   a first receiver configured to switch to a channel to be tuned and receive a broadcast signal;
   second receivers configured to receive broadcast signals from channels which are set for the second receivers, respectively;

a first controller configured to cause a video to be displayed on the basis of the broadcast signal received by the first receiver; and a second controller controlled by the first controller and configured to switch between a first mode and a second mode, the first mode controlling operations of the second receivers and causing the broadcast signals received by the second receivers to be recorded, and the second mode stopping operations of one of the second receivers and causing broadcast signals received by any remaining one or ones of the second receivers to be recorded, the second controller being further configured to set channels to be tuned to the second receivers and to stop operations of one of the second receivers to which no channel is set, if a number of the channels to be tuned is smaller than a number of the second receivers in an initial setting.

2. The apparatus of claim 1 wherein, responsive to an input of a stop instruction about one of the second receivers, the second controller stops operations of the corresponding one of the second receiver modules.

3. The apparatus of claim 1 wherein the second controller sets channels to broadcast signals to be received by the second receivers, on the basis of input for setting channels for the second receivers.

4. The apparatus of claim 1 comprising a recorder configured to record videos on the basis of broadcast signals received by the second receivers.

5. The apparatus of claim 4 wherein the second controller stops operations of the recorder associated with one of the second receivers operation of which is stopped.

6. The apparatus of claim 4 wherein, on the basis of input of a stop instruction about the second controller, the first controller stops operations of the second controller, the second receivers, and the recorder.

7. The apparatus of claim 1 comprising a display configured to display a video on the basis of the broadcast signal received by the first receiver.

8. A recording method comprising:

switching to a channel to be tuned, and receiving a broadcast signal by a first receiver;

displaying a video on the basis of the broadcast signal received by the first receiver, the displaying of the video being controlled by a first controller;

switching between a first mode and a second mode, the first mode driving controlling operations of second receivers configured to respectively receive broadcast signals of set channels and recording broadcast signals received by the second receivers, and the second mode stopping operations of one of the second receivers and recording broadcast signals received by any remaining one or ones of the second receivers; and setting channels to be tuned to the second receivers and stopping operations of one of the second receivers to which no channel is set, if a number of the channels to be tuned is smaller than a number of the second receivers in an initial setting, wherein at least the switching operations being performed by a second controller controlled by the first controller.

\* \* \* \* \*